3,140,230
METHOD OF STIMULATING THE CARDIAC AND BRONCHIAL BRANCHES OF THE CENTRAL NERVOUS SYSTEM
Robert Jequier, St.-Maur, France, assignor to Roussel-UCLAF, Paris, France, a corporation of France
No Drawing. Filed Apr. 4, 1962, Ser. No. 184,962
Claims priority, application France June 23, 1961
4 Claims. (Cl. 167—58)

The invention relates to a method of stimulating the cardiac and bronchial branches of the central nervous systems of humans by administering an effective amount of D(—)α-fluoro-camphor.

D(—)α-fluoro-camphor possesses a cardiac and respiratory analeptic activity. It can be used for the treatment of respiratory troubles due to emphysema or bronchitis and cardiac weaknesses occurring after a syncope, medically induced intoxication or an electric shock. D(—)α-fluoro-camphor possesses a positive inotropic effect and augments and reenforces the heartbeat of intoxicated or normal hearts. It possesses a more rapid and more intense action than camphor at lower dosages.

It is an object of the invention to provide a composition for the stimulation of the cardiac and bronchial branches of the central nervous system comprising administering an effective amount of D(—)α-fluoro-camphor.

It is an additional object of the invention to provide a method of stimulating the cardiac and bronchial branches of the central nervous system by administering a daily dose of 0.02 to 0.10 grams of D(—)α-fluoro-camphor.

These and other objects and advantages of the invention will become obvious from the following detailed description.

D(—)α-fluoro-camphor is a known compound which can be prepared according to the principles described by Lange et al., Naturwiss., vol. 17 (1960), p. 397. The reaction scheme is as follows:

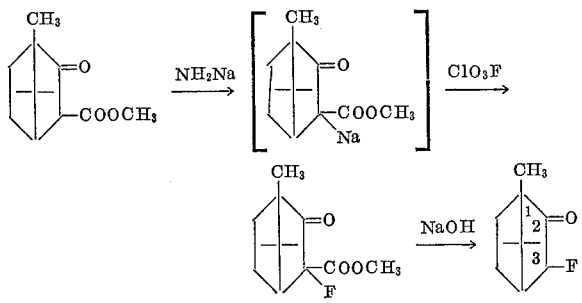

D(—)α-fluoro-camphor occurs in the form of colorless needles soluble in alcohol, ether, olive oil, acetic acid, acetone, benzene, chloroform and pentane and insoluble in water and aqueous solutions of acids and alkalis. Its melting point as determined on the Kofler block is 177–178° C. and its specific rotation is $[\alpha]_D^{20} = -4.8°$ (c.=0.5% in ethanol).

D(—)α-fluoro-camphor can be administered by transcutaneous methods, by local methods of topic application on the skin and mucous membranes, or by rectal methods. It can be prepared in the form of injectable solutions or suspensions, contained in ampules, multiple dose flacons or syringes prepared for injection or in suppositories, pomades, unguents or lotions prepared in the usual manner.

The effective dosage is between 0.02 to 0.05 gram per unit dose and 0.02 to 0.10 gram per daily dose for humans.

An injectable solution of D(—)α-fluoro-camphor is, for example, a solution in propylene glycol or in arachis oil in a concentration of 100 mg./cc.

1. PHARMACOLOGICAL STUDY OF D(—)α-FLUORO-CAMPHOR

(a) Action on the Isolated Frog's Heart

According to the classic technique of Straub, either Ringer liquid or a solution of potassium chloride containing 400 gammas per cc. were introduced into the ventricle of a suspended frog's heart by a cannula allowing the introduction of the liquid. The heartbeats were registered before and after potassium intoxication.

A solution containing 5 gammas of D(—)α-fluoro-camphor per cc. were introduced by the cannula. Thereafter, there was noted a very clear renewal of the heartbeats and an increase of amplitude of movements of the heart.

The introduction of a solution containing 10 gammas of D(—)α-fluoro-camphor per cc. caused the auriculoventricular dissociation to disappear and the introduction of a solution of the said compound containing 15 gammas per cc. provoked a return of the heartbeats to normal.

According to a modified technique, a bit of the ventricle was intoxicated by a solution of potassium chloride. The introduction of 100 gammas of D(—)α-fluoro-camphor per cc. brought the contractions to their normal frequency. Under the same conditions and the same concentration, camphor did not have any effect.

(b) Action on the Coronary Blood Flow

Study of the action of D(—)α-fluoro-camphor on the coronary blood flow was made on the isolated rabbit heart by utilizing a technique inspired from Langendorf (Arch. gesam. Physiol., 1895, 61, 291). In this method, the heart was suspended by its aorta to a cannula and the coronary system was perfused by means of this cannula with Locke serum at a pH of 7.2 to 7.3, heated to 37° C. under a constant pressure of 5 cm. of mercury.

The compound studied was placed in solution in ethanol. This solution was diluted with Locke serum to a convenient concentration. A three-way stopcock allowed instantaneous passage of either the normal Locke serum or the serum containing the product to be studied. On a proper machine, the coronary blood flow was registered and parallelly the ventricle contractions.

The threshold concentration of D(—)α-fluoro-camphor which clearly augments the coronary blood flow was determined. Then after perfusion of barium chloride containing 50 gammas per cc., the administration of a solution of D(—)α-fluoro-camphor at a dose of 10 gammas per cc. caused an increase of 50% in the coronary blood flow for a period of more than 15 minutes. The D(—)α-fluoro-camphor manifested at the same time a slightly positive inotropic action. In the same manner, after perfusion in a solution of potassium chloride containing 840 gammas per cc., the administration of D(—)α-fluoro-camphor in a dose of 10 gammas per cc. reenforced the ventricular beats.

(c) Action on Electrocuted Rabbit Heart

D(—)α-fluoro-camphor was utilized in solution in propylene glycol in a concentration of 10 mg./cc. The extrasystoles in rabbit were provoked with the aid of a Grass stimulator. While a difference in potentional of 15 volts caused an extrasystole in the control animal, the injection of 3 mg./kg. of D(—)α-fluoro-camphor protected the animal for at least one hour against the effect of such voltage.

In addition, although the threshold of appearance of extrasystoles was 4 volts in the normal untreated animal, the voltage necessary for this appearance was 8 volts in an animal having received 3 mg./kg. of D(—)α-fluoro-camphor 30 minutes before, of 15 volts in animals treated 45 minutes before and of 40 volts in animals treated 60 minutes before. Under the same conditions, the threshold of appearance of extrasystoles in animals having received 5 mg./kg. of camphor was 9 volts 30 minutes after injection and 25 volts 45 minutes after injection.

*(d) Effect on the Carotid Pressure in Dogs*

Dogs anesthetized with somnifene received an injection of histamine hydrochloride at a dose of 25 gammas per kilogram. The subsequent administration of D(—)α-fluoro-camphor at a dose of 10 mg./kg. brought back the carotid pressure and cardiac frequency to their normal value.

2. TOXICITY DETERMINATIONS

Acute toxicity was determined on lots of mice of the Rockland strain weighing between 18 and 22 g. D(—)α-fluoro-camphor was injected by intraperitoneal methods in the form of an oily solution. The effects of D(—)α-fluoro-camphor were rapid and manifest. At toxic doses, they were at once violent. The manifestations of intoxication consisted in polynea and agitation. These manifestations were accompanied at elevated doses with clonic convulsions. The animals present prolonged crises and die of exhaustion after a tonic crisis. The mortal doses caused a rapid death after violent convulsions.

The mortality and frequency of convulsions are summarized in the following table.

| Doses mg./kg. | Convulsions | Mortality |
|---|---|---|
| 50 | 0/13 | 0/13 |
| 100 | 10/13 | 5/13 |
| 200 | 5/5 | 5/5 |
| 500 | 3/3 | 3/3 |

From the above it can be seen that for D(—)α-fluoro-camphor the $DL_{50}$ is about 120 mg./kg. and the $DC_{50}$, the dose causing appearance of convulsions in 50% of the animals, is about 80 mg./kg.

The respirator exciting effects of D(—)α-fluoro-camphor at elevated doses and the convulsing effects are entirely similar to those of camphor. The effects manifest themselves very rapidly because of the great diffusibility of D(α)-fluoro-camphor. Nevertheless, the dose of 50 mg./kg. provokes neither convulsion nor mortality indicating that the product possesses a very large therapeutic margin.

I claim:

1. The method of stimulating the cardiac and bronchial branches of the central nervous system which comprises administering from 0.02 gram to 0.10 gram of D(—)α-fluoro-camphor per day.

2. The method of stimulating the cardiac and bronchial branches of the central nervous system which comprises administering from 0.02 gram to 0.10 gram of D(—)α-fluoro-camphor per day in the form of an injectable solution.

3. The method of overcoming a cardiac weakness of the heart which comprises administering from 0.02 gram to 0.10 gram of D(—)α-fluoro-camphor per day in the form of an injectable solution.

4. The method of stimulating the cardiac and bronchial branches of the central nervous system which comprises administering from 0.02 gram to 0.10 gram of D(—)α-fluoro-camphor per day in the form of suppositories.

References Cited in the file of this patent

Burger: Medicinal Chem. Sec. Ed., Interscience Pub. Inc., N.Y., 1960, p. 394.

Merch Index, 7th Ed., 1960, pp. 201–202.

Lange: Chem. Abst., vol. 55, 1961, p. 2721d.